(12) United States Patent
Witte

(10) Patent No.: US 6,862,443 B2
(45) Date of Patent: Mar. 1, 2005

(54) REMOTE COMMUNICATION SYSTEM FOR USE WITH A VEHICLE

(75) Inventor: Markus Valter Witte, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 342 days.

(21) Appl. No.: 10/023,538

(22) Filed: Dec. 17, 2001

(65) Prior Publication Data

US 2002/0146999 A1 Oct. 10, 2002

(51) Int. Cl.[7] .............................................. H04B 1/06
(52) U.S. Cl. .................. 455/345; 455/456.1; 455/346; 455/344; 455/353; 340/9.88; 340/5.23; 340/539; 340/425.5; 340/426
(58) Field of Search ............................... 455/346, 344, 455/353, 345, 456.1; 340/9.88, 5.23, 539, 425.5, 426

(56) References Cited

U.S. PATENT DOCUMENTS 5,864,297 A  *  1/1999  Sollestre et al. ........... 340/5.23
6,169,497 B1 *  1/2001  Robert ....................... 340/988
6,631,271 B1 * 10/2003  Logan ..................... 455/456.1
2002/0107010 A1    8/2002  Witte et al.

* cited by examiner

Primary Examiner—David Hudspeth
Assistant Examiner—David Q Nguyen

(57) ABSTRACT

This invention relates to a remote communication system for use with a vehicle, comprising a first communication unit (1), located within a vehicle (2), said first communication unit comprising a first transceiver (3), connectable with a long-distance wireless communication network (16), such as a cellular network; and a portable second communication unit (7), comprising a second transceiver (9), connectable with a unit for long-distance wireless communication (14), such as a cellular terminal. The first and second communication units (1,7) are connectable with each other using said long-distance wireless communication network 16, thereby establishing a remote two-way communication link between said communication units.

This invention further relates to a fob unit, for use in a remote communication system.

7 Claims, 3 Drawing Sheets

REMOTE COMMUNICATION SYSTEM FOR USE WITH A VEHICLE

TECHNICAL FIELD OF THE INVENTION

The present invention relates to a remote communication system for use with a vehicle. It also relates to a fob unit for use in such a remote communication system.

BACKGROUND ART

Many systems for remote tracking of a vehicle, using for example the global positioning system, a cellular network or direct RF communication, are previously known. However, most of these systems are passive, only providing information regarding the position of the vehicle. Further, some systems have been suggested, providing the possibility of remote control of certain features within the vehicle, such as starting the engine for warm-up, but these systems are usually operated with RF communication or the like, thereby having a limited range.

In the patent document EP-0 955 219 a system is suggested in which a cellular telephone terminal may be used in order to connect with a vehicle from a remote connection. However, such a communication is rather unsafe, since a cellular telephone usually does not provide for a safe authorization of the connection before it is established. Furthermore, a cellular telephone is not designed to be used for controlling a vehicle, and consequently, more advanced monitoring may be quite complicated to accomplish.

Therefore, it is a primary object of the present invention is to provide a system that enables a user to make a safe and simple remote connection with a vehicle, for example for monitoring the vehicle or performing a remote check-up.

Another object of the invention is to provide a flexible system, which may be used in a variety of ways.

SUMMARY OF THE INVENTION

These and other objects are achieved by a remote communication system for use with a vehicle comprising a first communication unit, located within a vehicle, said first communication unit comprising a first transceiver, connectable with a long-distance wireless communication network 16, such as a cellular network; and a second portable communication unit, comprising a second transceiver, connectable with a unit for long-distance wireless communication, such as a cellular terminal, whereby said first and second communication units are connectable with each other using said long-distance wireless communication network, thereby establishing a remote two-way communication link between said communication units.

By establishing a two-way communication link between a portable communication unit and a vehicle, a user is able to perform a remote check-up of the car, for example checking the gas level of the tank or whether the doors of the vehicle are locked. Further, information may be transferred over said link to or from the vehicle. For example, a travel plan, map or the like, stored in the second communication unit, may be transmitted from the second communication unit to the first communication unit.

Preferably, said second communication unit is connectable with said unit for long-distance communication using a short-distance wireless communication link. One example of such a short-distance wireless communication link is a link established between two Bluetooth circuits. By using a wireless communication link, such as the standard Bluetooth, the establishment of said link may easily by accomplished without additional external equipment.

Further, said second communication unit is preferably a fob unit. This is a practical solution, since most vehicles today are equipped with a fob for remote locking/unlocking of the vehicle doors. Consequently, a user of a vehicle normally already carries such a unit, making the system according to the invention consumer friendly.

According to one embodiment of the invention the second communication unit is integrated with a cellular terminal. This construction reduces the number of components of the system.

Further, said second communication unit preferably comprises a biometric sensor 18, for identifying a user. By first identifying a user, unauthorized remote connection to the vehicle is prevented. Further, this user identification may be used in order to personalize the vehicle and different vehicle settings.

Preferably, a direct short-distance two-way wireless communication link is established between said first and second transceivers when said communication units are within a direct communication range from each other. Further, said first communication unit suitably comprises a first memory circuit being connected with said first transceiver, and said second communication unit further comprises a second memory circuit being connected with said second transceiver, whereby an information item, stored in any one of said memory circuits is transmittable to the other one of said memory circuits, over said direct short-distance communication link when established. Consequently, over this communication link it is possible to transfer information between a portable unit and the vehicle, without active user assistance.

Preferably, said first and second communication unit each comprises an identification item, whereby a request for connection from any communication unit is tested to be qualified before a connection between said communication units is enabled. Thereby, a second communication unit requesting to connect with a first communication unit within a vehicle over said cellular network is identified, and unauthorized requests may be denied. This feature also makes it possible to determine which communication units should be able to communicate with each other, when several units are within direct communication range from each other. Consequently, a second communication unit, or a fob, may be associated with a certain vehicle, providing a safe transfer of information.

Further, said first communication unit is preferably connected with at least one vehicle data network, such as a controller area network within said vehicle. Thereby basically all features that may be measured electrically within a vehicle may be accessed in a remote communication system in accordance with the invention. Suitably, said first communication unit is connected with a vehicle computer within said vehicle. Thereby travel information, such as route plans or desired time of arrival may easily be transferred between the second communication unit and the vehicle computer.

Finally, the above mentioned and other objects are achieved by a fob unit, for use in a remote communication system as described above.

BRIEF DESCRIPTION OF THE DRAWINGS

A currently preferred embodiment of the present invention will now be described in closer detail, with reference to the accompanying drawing.

DETAILED DESCRIPTION OF A PREFERRED EMBODIMENT OF THE INVENTION

The embodiment of the invention, which will be described in the following, is related to a remote communication system for use with a vehicle.

Figure 1:
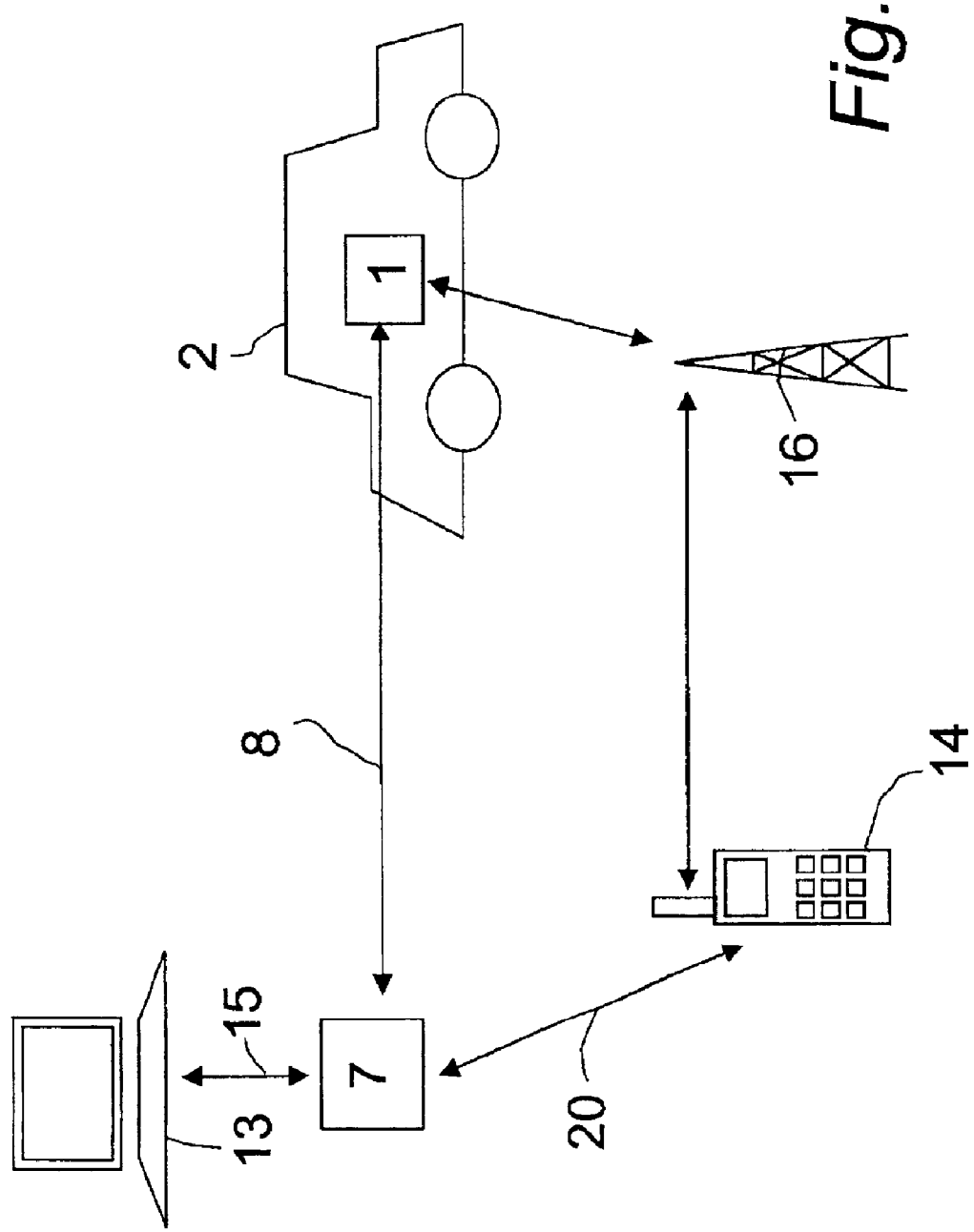
FIG. 1 is a schematic view of a system in accordance with the invention.
Figure 2:
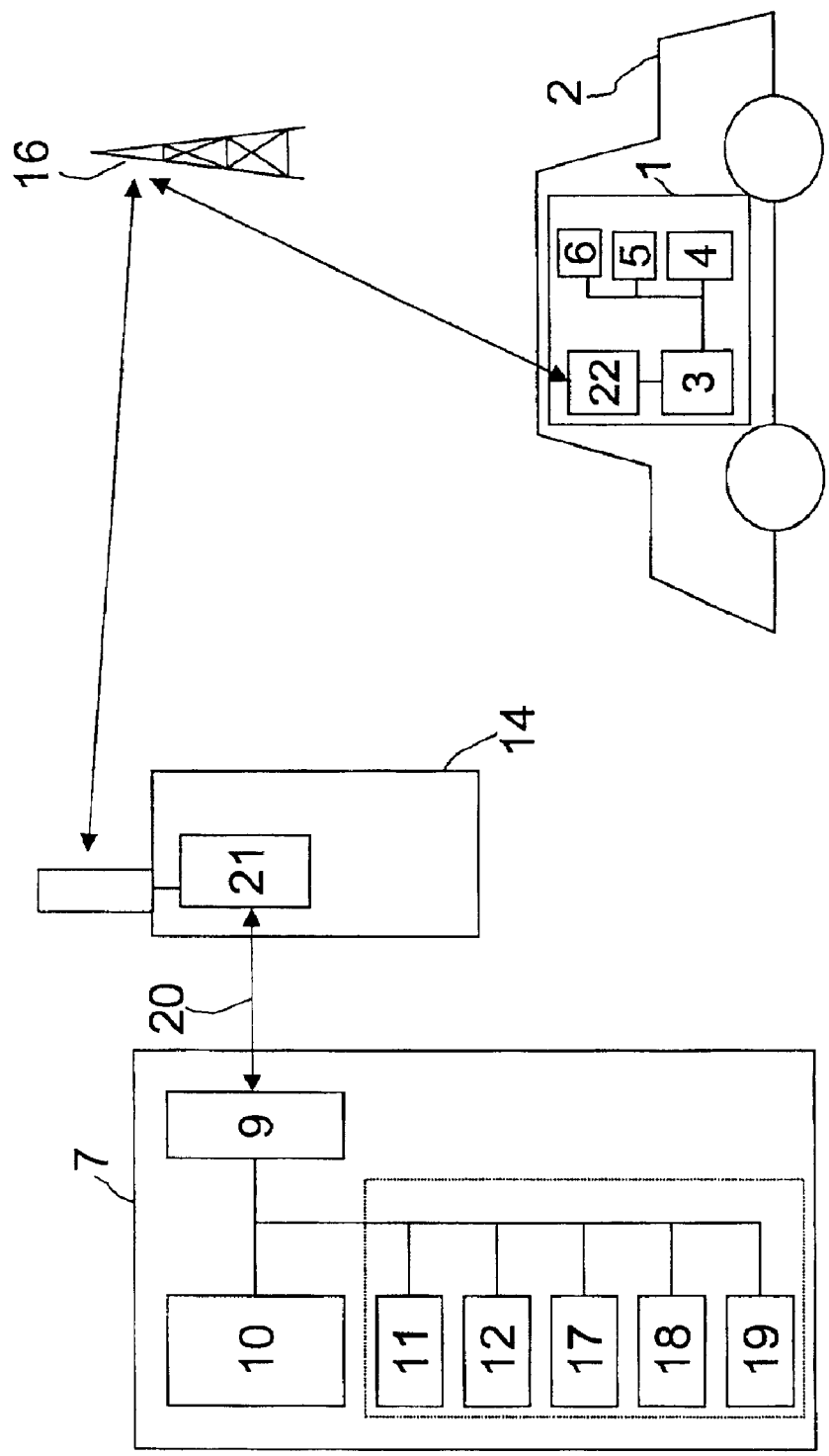
FIG. 2 is a schematic view of one preferred embodiment of the invention.

Referring now to FIG. 1, the system comprises a first communication unit 1, being positioned within a vehicle 2. The first communication unit 1 comprises a first transceiver 3 for wireless communication and a first memory circuit 4, as shown in FIG. 2. The first memory circuit 4 is connected to said first transceiver 3, being able to connect with a cellular network via an antenna unit 22. The first communication unit 1 is further connected with a vehicle travel computer 5 and with a controller area network 6 within said vehicle 2.

The system further comprises a second communication unit 7, here constituted by a portable, handheld fob unit, comprising a second transceiver 9 for wireless communication, and a second memory circuit 10, as shown in FIG. 2. The second memory circuit 10 is connected to said second transceiver 9, in this case being a standard Bluetooth circuit. Said second transceiver 9 may be connected with a corresponding Bluetooth transceiver 21 in a cellular telephone 14 via a wireless communication link 20. The establishment of this communication link 20 is in this case performed in accordance with the Bluetooth standard, and will not be described herein. However, it should be mentioned that each Bluetooth circuit is equipped with a special identification code, being unique for each circuit. This identification code enables a transceiver to establish a connection with one chosen other transceiver within the communication range. Further, in accordance with a preferred embodiment, each vehicle is provided with several associated fob units. In this case, each fob unit has a special fob ranking, whereby the fob with the highest ranking is arranged to override other fobs if two or several fobs are trying to give contradicting orders to the first communication unit 1.

Further, the fob unit 7 may be equipped with a display 11, for displaying information stored in said second memory circuit 10, a processor 12 for processing information stored in said second memory circuit 10 and a clock circuit 17 for use in certain applications. The second communication unit 7 further comprises a battery 19 or the like, for providing power to the components of the second communication unit 7.

Further, the fob unit 7 comprises a biometric sensor 18, in this case a fingerprint sensor, being connected with said second transceiver 9. This biometric sensor 18 may be used to provide an identification of the fob user, preventing unauthorized use of the fob. Several different user characteristics may be stored in the second memory circuit 10.

In order to establish a remote two-way connection between the first and second communication units 1, 7, a user first makes sure that the fob unit 7 is within direct communication range of the cellular telephone terminal 14 (in the Bluetooth case <100 m), for the establishment of a direct two-way communication link 20 between the second transceiver 9 and the corresponding transceiver 21 in the cellular telephone terminal 14. Thereafter the user rings up the vehicle over the cellular network 16, and thereby connects with the first transceiver 3 of the first communication unit, via the cellular antenna unit 22 in the vehicle. Information regarding the user and fob identity, for example user information from said biometric sensor and the fob identification code, as described above, is thereafter transmitted from the fob to the first communication unit 1 of the vehicle 2. If the fob and user identities are accepted by the vehicle, a two-way connection between the first and second communication unit is allowed to be established, via the communication link 20 and the cellular network 16. If the fob and/or user identity is not authorized by the first communication unit 1, the request for establishment of a communication link between the communication units is rejected.

This two-way remote communication link between said communication units 1,7 may be used in various ways. For example, a user is able to perform a remote check-up of the car, for example checking the gas level of the tank or whether the doors of the vehicle are locked. Further, information may be transferred over said link to the vehicle. For example, a travel plan, map or the like, stored in the second communication unit, may be transmitted from the second communication unit to the first communication unit. What information should be transferred may be decided and programmed by the manufacturer of the system or by the user, by programming the fob and/or the first communication unit in the vehicle.

In this embodiment of the invention, the information transfer between said communication units is connected with the locking or unlocking of the vehicle. A locking/unlocking device (not shown) is on per se known manner integrated in said fob unit 7. When a locking/unlocking signal is sent to the vehicle for locking/unlocking the doors of the vehicle, a part of this signal is also transmitted to a trigger device (not shown) for the generation of a trigger signal. This trigger signal is thereafter transmitted to the memory units, where it triggers the execution of an information transfer operation. Further, the locking/unlocking signal may be sent over the second transceiver 9, or over a separate transmission channel.

Figure 3:
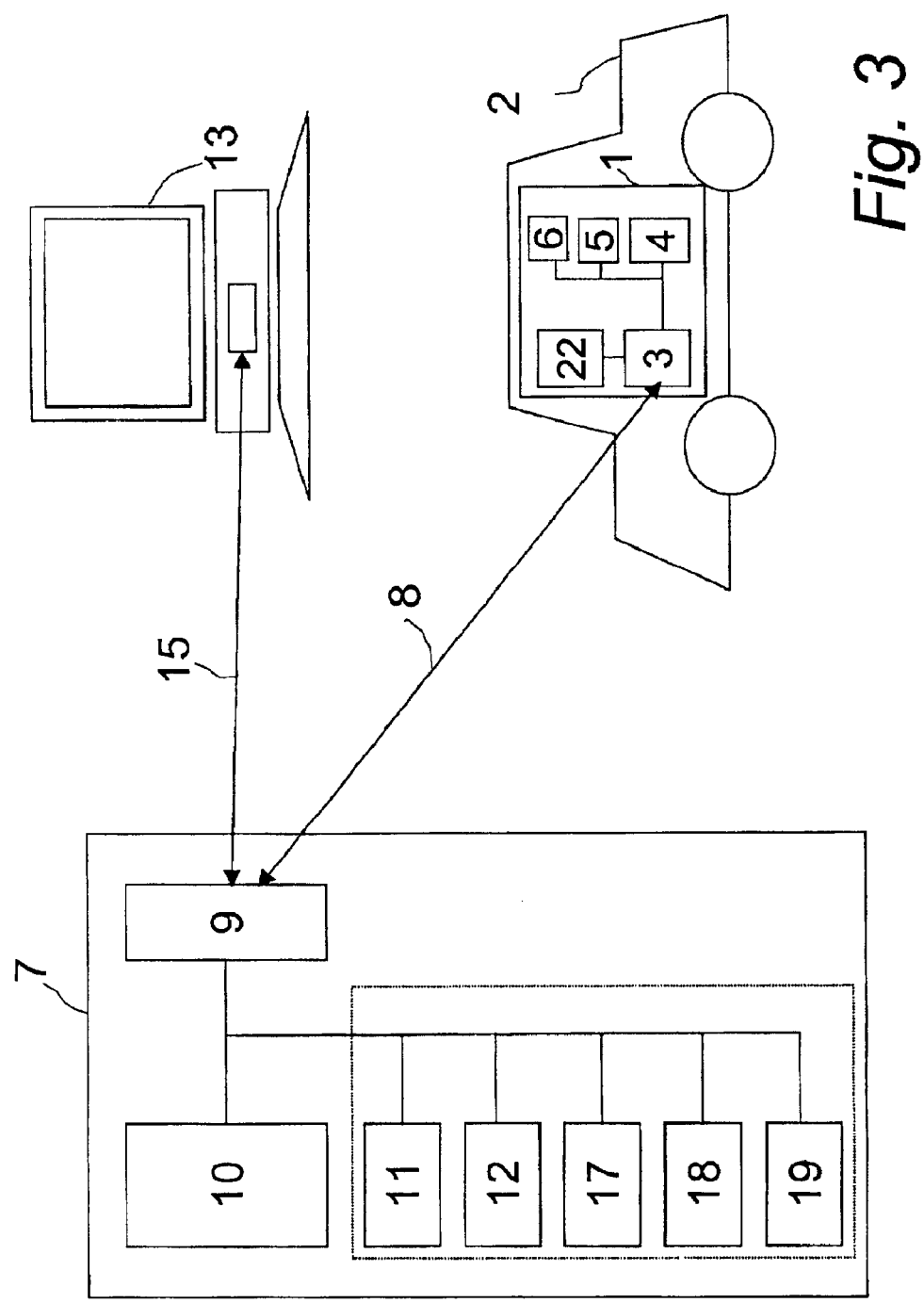
FIG. 3 is a schematic view of another aspect of the invention.

Further, said first transceiver 3 also comprises a Bluetooth transceiver device being directly connectable with said second Bluetooth transceiver 9 when said transceivers are within a short/medium distance from each other (in the Bluetooth case <100 m), thereby establishing a direct short-distance wireless communication link 8 between the fob unit 7 and the first communication unit 1 disposed within the vehicle 2, as shown in FIG. 3. The establishment of this communication link 8 is in this case performed in accordance with the Bluetooth standard.

By means of said second transceiver 9, said fob unit 7 may also be connected with other communication units, such as a personal computer 13, a hand held computer or other on market products, as shown in FIG. 3. By establishing a two-way communication link between for example a computer 13 and the fob unit 7 (second communication unit), an information item may be transferred between the computer and the second memory circuit 10 of the fob. This enables a user to personalize a vehicle by loading information regarding for example travel plans, personal setting, road maps etc into the fob, whereby the information item is transmitted to the vehicle as soon as the fob unit and the vehicle are within communication range from each other. This information transfer may also be done by the previously described remote communication fob.

By using standard transceivers, such as Bluetooth circuits, the fob may easily be adapted for use in various other applications. For example the fob unit may be programmed to function as a remote garage door opener. Since provided with a user identification device, such as a biometric sensor, the fob may also be used for other purposes, such as identifying a user at a tollbooth, for direct debiting of a personal account.

The establishment of the above-described direct short-distance wireless communication link 8 is described in the following. An information item is stored in the second memory circuit 10 of the fob unit 7. The second transceiver 9 of the fob unit 7 regularly sends out an identification signal. When the fob unit 7 is within a communication range from a vehicle 2 having a first transceiver 3, having a corresponding transceiver device and accepting said identification signal, a communication link 8 between the transceivers 3,9 is established. The first transceiver 3 may also send out a corresponding identification signal that must be accepted by the fob unit 7, before said communication link 8 may be established. When said communication link 8 is established, the information item that is stored in said second memory circuit 10 is transferred over the communication link 8 to the first transceiver 3 of the first communication unit 1 within the vehicle 2. Thereafter, the item is transferred from the first transceiver 3 to the first memory circuit 4 or directly to the travel computer 5 or the like.

Further, an information item stored in the first memory circuit 4 may be transferred to the fob 7 over said communication link 8 or over the remote communication link, in the same manner as described above. For example, information regarding the gasoline level may be gathered in the first memory circuit 4, and transferred to the fob unit 7 and stored in the second memory circuit 10, when leaving the vehicle 2. Consequently, this information is now available for remote check-up, since it is stored in the handheld, portable fob unit 7. Further, basically any information that may be gained through the vehicle control area network 6 may be transferred to the fob unit in the above manner. It shall be understood that the system also may comprise selector means (not shown), for selection of which information items should be transferred between the fob and the first communication unit.

The above described biometric sensor 18 of the fob may also be useful in the short-distance direct communication described above, by enabling a personalization of the vehicle when approaching the vehicle. The identification may be transmitted over said communication link 8 to the vehicle 2 as an information item, as described above. This enables the performance of personal settings in the vehicle, such as seat and steering wheel settings before entering the vehicle. By this identification, different users may further be given different access to the vehicle, for example one-door/multi-door unlocking or access to the glove compartment.

A number of user profiles may be registered, enabling a number of users to be identified with said biometric sensor, and thereby providing individual settings for every registered user. One important feature is that if a non-registered user intends to use the vehicle, the fob will notice that the user is non-registered and thereby putting the system into a standard mode, using pre-programmed standard settings, being chosen and programmed by a registered user. Further a registered user may program different settings for different categories of non-registered users, in this way creating different non-registered user profiles, that may be activated by the fob by a registered user. Examples of such profiles may be a car work-shop profile, with restricted access to for example the car telephone, the glove compartment and the trunk, a valet profile, with further restrictions regarding the vehicle speed, and a friend profile, only restricting the use of the car phone. The access given to a certain profile may be chosen and programmed by the registered user/users of the vehicle, and said profile is preferably activated by a registered user, before handing over the fob to a non-registered user. If no special profile is chosen for the non-registered user said pre-programmed standard settings is used. Further, the above mentioned restriction of the vehicle speed for some users is possible due to said connection of the first communication unit with the control area network of the vehicle. All those user specific features may easily be edited at a personal computer, and transferred to the fob, and thereafter to the vehicle.

Consequently, the system in accordance with the invention provides for a flexible, multi-purpose communication between a handheld fob unit and a communication unit located in a vehicle.

The present invention should not be considered as being limited to the above-described embodiment, but rather includes all possible variations falling within the spirit and the scope of this invention as defined by the appended claims. Many modifications and variations of the present invention will be readily apparent to those skilled in the art.

In the above, a preferred embodiment is described in which the second communication unit is comprised in a separate fob unit. However, it is possible to include said second communication unit in for example a cellular telephone or a portable handheld computer, reducing the number of components of the system.

The system may also include a panic button, being placed on the fob unit (the second communication unit). When pushing said panic button, a message is automatically sent, via a communication link 20 to a nearby positioned cellular telephone terminal 14 and the cellular network 16, to the vehicle and to an alarm center, whereby a user is able to signal that he is in danger. By using the biometric sensor, as described above, the alarm message may further include information regarding the identity of the current user of the fob. It is also possible, by means of a positioning system, such as GPS or the like, to include information regarding the position of the user in the alarm message.

The above-described presently preferred embodiment of the invention utilizes Bluetooth circuits as the transceivers in the fob, the cellular telephone and also in the first communication unit in the vehicle. However, it is possible to use other devices and methods to establish said two-way connection between the first said devices. For example, RF circuitry may be used. The above mentioned devices should then also include control circuits for the RF circuits in order to control the communication link and its establishment, on per se known manner. The corresponding control circuits are included in the Bluetooth circuit. The remote communication system may also comprise two or more ways of establishing said connection. As an example, a separate communication link, such as a RF communication link, may be used for sending locking/unlocking signals for the vehicle door/doors when within a direct communication range of the vehicle, while the above described communication links 20,8 are used for remote and direct information transfer, respectively.

It shall be noted that the term transceiver as used in this application comprises various constructions, for example with separate receivers and transmitters. Further the fob unit may comprise other components, such as a mechanical vehicle key or the like.

Further it shall be noted that the term "long-distance wireless communication network" as used in this application may partly include transmission paths where the signal transfer is made in a wire or fiber, such as an alternative communication path between base stations or the like.

What is claimed is:

1. A remote communication system for use with a vehicle, comprising:
- a first communication unit, located within a vehicle, said first communication unit comprising a first transceiver, connectable with a long-distance wireless communication network, such as a cellular network; and
- a second nortable communication unit, comprising a second transceiver, connectable with a unit for long-distance wireless communication, such as a cellular terminal,
- whereby said first and second communication units are connectable with each other using said long-distance wireless communication network, thereby establishing a remote two-way communication link between said first and second communication units;
- wherein said remote two-way communication link established between said first and second communication units extends from said first communication unit to said long-distance wireless communication network to said unit for long-distance wireless communication to said second communication unit such that information is transferrable from said first communication unit to said second communication unit over the remote two-way communication link and such that information is transferrable from said second communication unit to said first communication unit over the remote two-way communication link;
- wherein said second communication unit is connectable with said unit for long-distance communication using a short-distance wireless communication link;
- wherein said second communication unit is a fob unit.

2. A remote communication system in accordance with claim 1, wherein said second communication unit further comprises a biometric sensor, for identifying a user.

3. A remote communication system according to claim 1, wherein a direct two-way wireless communication link is established between said first and second transceivers when said communication units are within a communication range from each other.

4. A remote communication system according to claim 3, wherein said first communication unit further comprises a first memory circuit being connected with said first transceiver, and said second communication unit further comprises a second memory circuit being connected with said second transceiver, whereby an information item, stored in any one of said memory circuits is transmittable to the other one of said memory circuits, over said direct communication link when established.

5. A remote communication system according to claim 1, wherein said first and second communication units each comprises an identification device, whereby a request for connection from any communication unit is tested to be qualified before enabling a connection between said communication units.

6. A remote communication system according to claim 1, wherein said first communication unit is connected with at least one vehicle data network, such as a controller area network within said vehicle.

7. A remote communication system according to claim 1, wherein said first communication unit is connected with a vehicle computer within said vehicle.

* * * * *